US010747747B2

(12) United States Patent
Charlet et al.

(10) Patent No.: US 10,747,747 B2
(45) Date of Patent: Aug. 18, 2020

(54) INTERPRETING INVALID DATA AS VALID DATA

(71) Applicants: Kyle J. Charlet, Morgan Hill, CA (US); Kevin D. Hite, San Jose, CA (US); Richard V. Tran, San Jose, CA (US); International Business Machines Corporation, Armonk, NY (US)

(72) Inventors: Kyle J. Charlet, Morgan Hill, CA (US); Kevin D. Hite, San Jose, CA (US); Richard V. Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 14/567,163

(22) Filed: Dec. 11, 2014

(65) Prior Publication Data

US 2016/0171026 A1    Jun. 16, 2016

(51) Int. Cl.
*G06F 16/00* (2019.01)
*G06F 17/00* (2019.01)
*G06F 16/23* (2019.01)
*G06F 16/245* (2019.01)
*G06F 16/25* (2019.01)

(52) U.S. Cl.
CPC ........ *G06F 16/2365* (2019.01); *G06F 16/245* (2019.01); *G06F 16/254* (2019.01); *G06F 16/258* (2019.01)

(58) Field of Classification Search
CPC ......... G06F 17/30371; G06F 17/30424; G06F 17/30563; G06F 17/30569; G06F 12/00; G06F 17/30; G06F 17/30607; G06F 17/30318; G06F 17/30076; G06F 16/2365; G06F 16/245; G06F 16/258; G06F 16/254
See application file for complete search history.

(56) References Cited

U.S. PATENT DOCUMENTS 5,963,937 A * 10/1999 Yamasaki ........... G06F 12/0866
6,912,539 B1 * 6/2005 Kapitanski ............ G06F 16/258
707/683

(Continued)

OTHER PUBLICATIONS

US Patent Application, dated Aug. 20, 2015, for U.S. Appl. No. 14/831,506, filed Aug. 20, 2015, invented by Kyle J. Charlet et al., Total 23 pages.

(Continued)

*Primary Examiner* — Tony Mahmoudi
*Assistant Examiner* — Thai V Dang
(74) *Attorney, Agent, or Firm* — Janaki K. Davda; Konrad, Raynes, Davda and Victor LLP (57) ABSTRACT

Provided are techniques for interpreting invalid data that is a portion of a data set as valid data. A request is received to convert data from a first format to a second format for an application, wherein the data is a portion of a data set. It is determined that the data is invalid, wherein the invalid data cannot be processed by the application in the first format. It is determined whether the invalid data is to be interpreted as valid based on a flag. In response to determining that the invalid data is to be interpreted as valid, setting the invalid data to a new value in the second format that can be processed by the application.

12 Claims, 5 Drawing Sheets

(56) References Cited

U.S. PATENT DOCUMENTS

| | | | | |
|---|---|---|---|---|
| 7,275,087 | B2* | 9/2007 | Vaschillo | G06F 16/986 709/218 |
| 8,676,788 | B2 | 3/2014 | Charlet et al. | |
| 8,938,414 | B1* | 1/2015 | Kolesnikov | G06Q 10/063114 707/602 |
| 9,002,795 | B2* | 4/2015 | Messinger | G06F 3/0619 707/640 |
| 2001/0039540 | A1* | 11/2001 | Hofmann | H04L 61/35 |
| 2002/0174135 | A1 | 11/2002 | Pellegrin et al. | |
| 2005/0240600 | A1* | 10/2005 | Hill | G06Q 30/02 |
| 2007/0027845 | A1* | 2/2007 | Dettinger | G06F 16/24578 |
| 2007/0250472 | A1* | 10/2007 | Dettinger | G06F 16/2455 |
| 2007/0282910 | A1* | 12/2007 | Diggelen | B64G 1/1014 |
| 2008/0120286 | A1* | 5/2008 | Dettinger | G06F 16/2455 |
| 2010/0174752 | A1* | 7/2010 | Kimmel | G06F 11/1435 707/791 |
| 2010/0205010 | A1* | 8/2010 | Kosinski | G06F 19/3418 705/3 |
| 2010/0257145 | A1* | 10/2010 | Felsheim | G06F 16/258 707/692 |
| 2012/0158667 | A1* | 6/2012 | Raju | G06F 16/84 707/687 |
| 2013/0198093 | A1* | 8/2013 | Taylor, III | G06Q 50/18 705/311 |
| 2013/0246395 | A1 | 9/2013 | Charlet et al. | |

OTHER PUBLICATIONS

Preliminary Amendment, dated Aug. 20, 2015, for U.S. Appl. No. 14/831,506, filed Aug. 20, 2015, invented by Kyle J. Charlet et al., Total 5 pages.

List of IBM Patents or Patent Applications Treated as Related, Total 2 pp, Aug. 20, 2015.

C. Bormann et al., "Concise Binary Object Representation (CBOR) (RFC7049)", original publication date Oct. 1, 2013, An IP.com Prior Art Database Technical Disclosure, Total 109 pages (also available at http://ip.com/IPCOM/000232179D).

"SecureFiles Migration", dated Aug. 2008, an Oracle White Paper, Total 14 pages (also available at http://www.oracle.com/securefileperformance).

Office Action dated Dec. 22, 2016, for U.S. Appl. No. 14/831,506, filed Aug. 20, 2015, invented by Kyle J. Charlet et al., Total 17 pages.

Response to Office Action dated Mar. 22, 2017, for U.S. Appl. No. 14/831,506, filed Aug. 20, 2015, invented by Kyle J. Charlet et al., Total 14 pages.

Final Office Action, dated Aug. 4, 2017, for U.S. Appl. No. 14/831,506, filed Aug. 20, 2015, invented by Kyle J. Charlet et al., Total 20 pages.

Response to Final Office Action, dated Nov. 1, 2017, for U.S. Appl. No. 14/831,506, filed Aug. 20, 2015, invented by Kyle J. Charlet et al., Total 9 pages.

Office Action, dated Jun. 27, 2018, for U.S. Appl. No. 14/831,506, filed Aug. 20, 2015, invented by Kyle J. Charlet et al., Total 21 pages.

Response to Office Action, dated Sep. 27, 2018, for U.S. Appl. No. 14/831,506, filed Aug. 20, 2015, invented by Kyle J. Charlet et al., Total 19 pages.

Final Office Action, dated Mar. 22, 2019, for U.S. Appl. No. 14/831,506, filed Aug. 20, 2015, invented by Kyle J. Charlet et al., Total 27 pages.

Response to Final Office Action, dated Jun. 20, 2019, for U.S. Appl. No. 14/831,506, filed Aug. 20, 2015, invented by Kyle J. Charlet et al., Total 12 pages.

Office Action, dated Dec. 9, 2019, for U.S. Appl. No. 14/831,506, filed Aug. 20, 2015, invented by Kyle J. Charlet et al., Total 22 pages.

Response to Final Office Action, dated Feb. 21, 2020, for U.S. Appl. No. 14/831,506, filed Aug. 20, 2015, invented by Kyle J. Charlet et al., Total 10 pages.

Notice of Allowance, dated Apr. 2, 2020 for U.S. Appl. No. 14/831,506, filed Aug. 20, 2015, invented by Kyle J. Charlet et al., Total 17 pages.

* cited by examiner

INTERPRETING INVALID DATA AS VALID DATA

FIELD

Embodiments of the invention relate to interpreting invalid data that is a portion of a data set as valid data. The data may not adhere to a specified data format.

BACKGROUND

Many applications today generate queries to retrieve data from a wide variety of sources (e.g., big data, analytics, and reporting). Typically, with a query, if one of the items returned in the query is corrupted, then the query as a whole will fail. However, when identifying trends based on huge volumes of data, then the accuracy of the data retrieval may not matter as much as how quickly the data is processed. In this case, it may not matter if a small sample of the data is corrupted.

One such scenario is identifying market trends where data velocity (i.e., the speed at which data is processed) is more important than hitting 100% data retrieval. An investment company may want to adjust their portfolio based on stock trends of individual investors, in which case the speed at which they identify such trends is important as the stock value may start to shift drastically. Another example is sports bets, where a gambling company may want to adjust wagering odds based on the number of wagers being made.

In general, for some situations, users do not want to throw away their query results if 99% of the data is valid, especially if they're pulling data from a large number of sources which may not provide guaranteed reliability. This may be important when other factors, such as data velocity, are of a higher priority to the user.

Structured Query Language (SQL) is a programming language for querying a database. However, there are also Not Only SQL (NoSQL) databases that may be document stores.

A NoSQL database may store a document, such as a Binary JavaScript® Object Notation (BSON) document, which is constructed from data points from multiple tables. (JavaScript is a registered trademark of Oracle Corporation in the United States and/or other countries.) A MongoDB is a NoSQL database. If one of those data points is bad, then the entire BSON document may be treated as bad and considered unusable, and the MongoDB may return an exception. BSON documents may be corrupted for a number of reasons, such as: the data was originally valid but was overwritten by a stray pointer; the database is corrected from a disk error or unclean shutdown without journaling, a byte was corrected on the network or through a broken network component; or the corruption happens when dealing with collections that may result in a segmentation fault.

A MongoDB provides a validate function to double check that the structure BSON object is properly formed and a repair function to fix the BSON document if needed, but both functions add additional time to the look up process, which adds additional performance overhead and impacts data velocity.

Another example is structured Large Object (LOB) data. In some cases, the LOB data may have multiple field definitions for the same data buffer, and, in some situations (e.g., where a packed decimal and a character field overlap), there may be invalid data. That is, it is possible that some character strings will equate to an invalid packed decimal value. A BLOB is a Binary LOB and a CLOB is a Character LOB. A BLOB may be an mp3 file, a picture or a JavaScript® Object Notation (JSON) document, while a CLOB may be a JSON document or Extensible Markup Language (XML) type of document.

In certain conventional systems, an application provides customized error handling to catch faulty data and filters these out of the result set. This solution requires affinity with how the data source will provide an error and cannot be used in off the shelf tools that typically require zero affinity to the pulled data sources.

SUMMARY

Provided is a method for interpreting invalid data that is a portion of a data set as valid data. The method comprises: receiving, with a processor of a computer, a request to convert data from a first format to a second format for an application, wherein the data is a portion of a data set; determining that the data is invalid, wherein the invalid data cannot be processed by the application in the first format; determining whether the invalid data is to be interpreted as valid based on a flag; and, in response to determining that the invalid data is to be interpreted as valid, setting the invalid data to a new value in the second format that can be processed by the application.

Provided is a computer program product for interpreting invalid data that is a portion of a data set as valid data. The computer program product comprises a computer readable storage medium having program code embodied therewith, the program code executable by at least one processor to perform: receiving, by the at least one processor, a request to convert data from a first format to a second format for an application, wherein the data is a portion of a data set; determining, by the at least one processor, that the data is invalid, wherein the invalid data cannot be processed by the application in the first format; determining, by the at least one processor, whether the invalid data is to be interpreted as valid based on a flag; and, in response to determining that the invalid data is to be interpreted as valid, setting, by the at least one processor, the invalid data to a new value in the second format that can be processed by the application.

Provided is a computer system for interpreting invalid data that is a portion of a data set as valid data. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: receiving a request to convert data from a first format to a second format for an application, wherein the data is a portion of a data set; determining that the data is invalid, wherein the invalid data cannot be processed by the application in the first format; determining whether the invalid data is to be interpreted as valid based on a flag; and, in response to determining that the invalid data is to be interpreted as valid, setting the invalid data to a new value in the second format that can be processed by the application.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
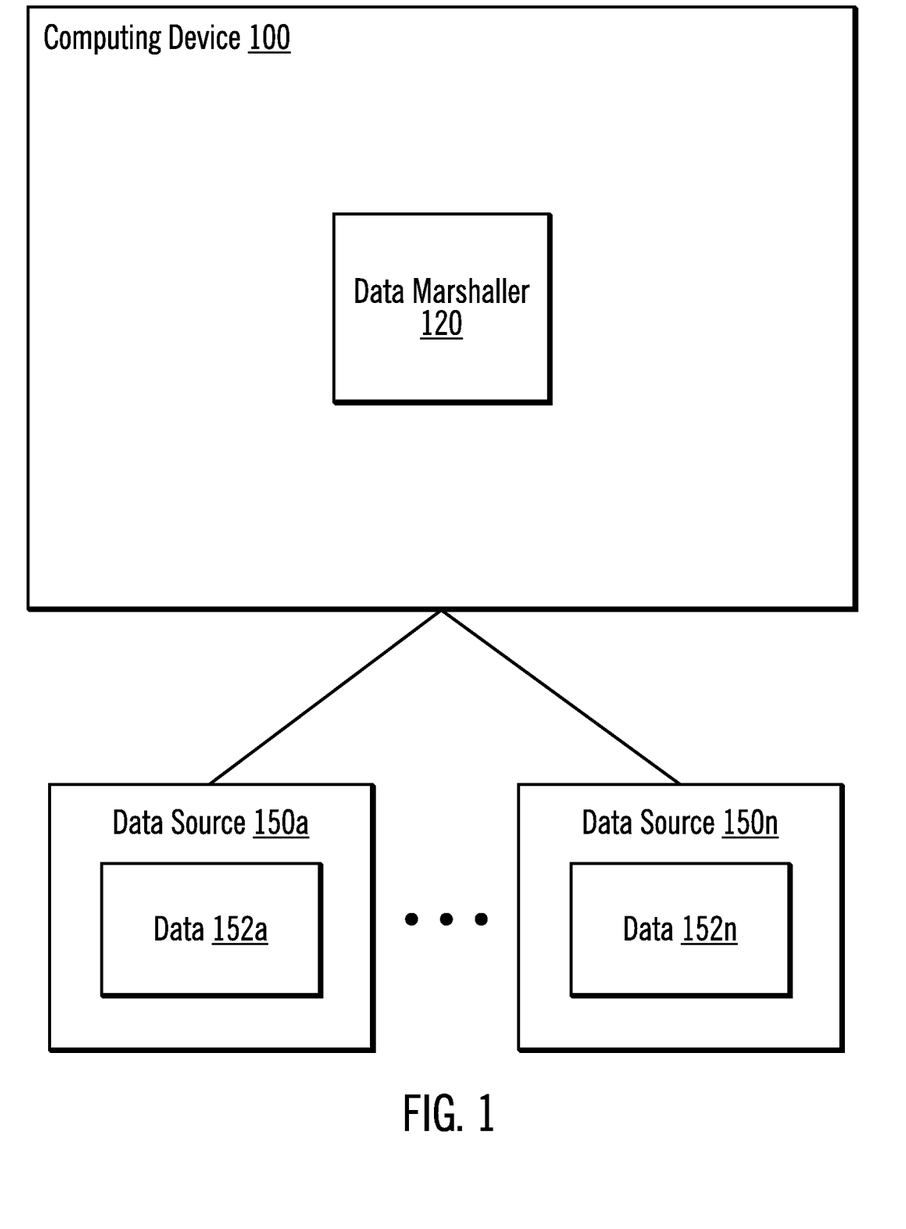
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to data stores 150a . . . 150n (where the letters "a" and "n" and the ellipses in FIG. 1 are used to indicate that there may be any number of data sources in various embodiments). The computing device 100 includes a data marshaller 120. Each data store 150a . . . 150n includes data 152a . . . 152n. The data may be any type of data (e.g., LOB data, BLOB data, CLOB data, a BSON document, a JSON document or other data).

Figure 2:
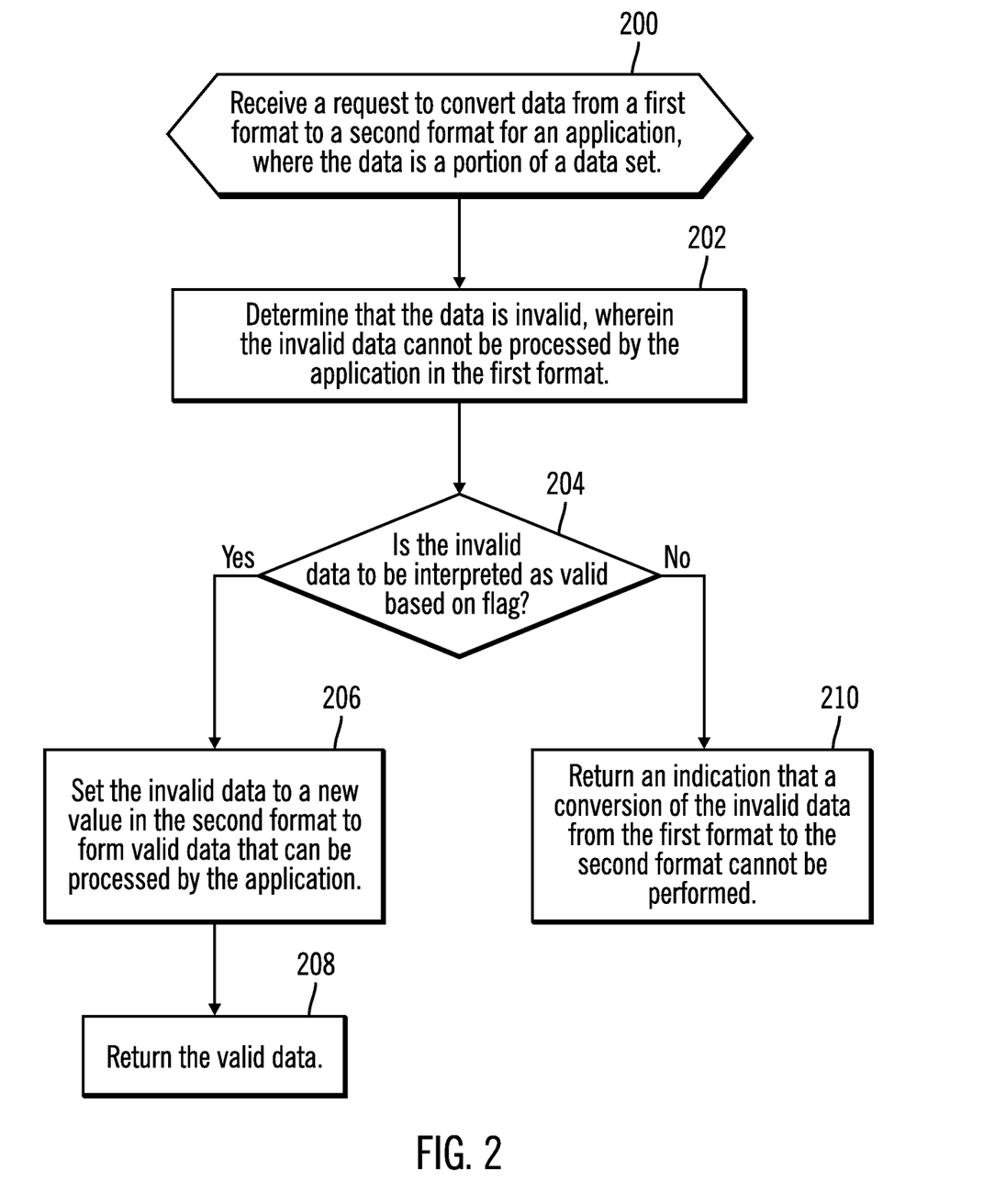
FIG. 2 illustrates, in a flow diagram, operations for determining how to process invalid data in accordance with certain embodiments.

FIG. 2 illustrates, in a flow diagram, operations for determining how to process invalid data in accordance with certain embodiments. Control begins at block 200 with the data marshaller 120 receiving a request to convert data from a first format to a second format for an application, where the data is a portion of a data set. For example, the data set may be a LOB with multiple fields, and the data that is a portion of the data set is a field in the LOB. As another example, the data set may be a document with multiple data points, and the data that is a portion of the data set is a data point in the document. The processing of FIG. 2 may occur for each portion of the data set (e.g., each field in the LOB or each data point in the document).

In block 202, the data marshaller 120 determines that the data is invalid, wherein the invalid data cannot be processed by the application in the first format. In various embodiments, the invalid data is bad data or corrupted data. The invalid data may be described as data that cannot be properly converted to an expected data format (e.g., expected by the application). In certain embodiments, a flag is used to determine whether the invalid data is to be interpreted as valid data. In certain embodiments, the flag is set for an application. In certain other embodiments, the flag is set per query by the application.

In block 204, the data marshaller 120 determines whether the invalid data is to be interpreted as valid data based on the flag. If so, processing continues to block 206, otherwise, processing continues to block 208.

In block 206, in response to determining that the invalid data is to be interpreted as valid data, the data marshaller 120 sets the invalid data to a new value in the second format that can be processed by the application. In various embodiments, the new value may be a NULL value or may be a different value that allows conversion of the data from the first format to the second format. In certain embodiments, the data in the first format is substituted with another value such as 0, −1, another designated default value (e.g., a default value for a column of a table, a field of a LOB, or a data point of a document), etc. The substituted value may be based on user (e.g., system administrator) input or based on a pre-defined specification that provides rules for converting invalid data. In block 208, the data marshaller 120 returns the valid data. Thus, with embodiments, even if a portion of a data set (e.g., a portion of a LOB or BSON document) is invalid data, that data may be treated as valid data so that the data set (e.g., LOB or BSON document) may be processed without causing a conversion exception and without being discarded.

In block 210, in response to determining that the invalid data is not to be interpreted as valid data, the data marshaller 120 returns an indication that a conversion of the invalid data from the first format to the second format cannot be performed. That is, a conversion exception has been thrown.

In certain embodiments, the invalid data may be part of a LOB (e.g., may be a field of a LOB having multiple fields), and, instead of throwing away a whole LOB when one or more fields have invalid data, embodiments interpret the one or more fields with invalid data as each having a valid value or a NULL value.

As another example, a BSON document is constructed from data points from multiple tables, and if one or more data points has invalid data, then, instead of throwing away the entire BSON document, embodiments interpret the one or more data points with invalid data as each having a valid value or a NULL value.

With embodiments, the decision to prioritize data velocity versus data accuracy may be on a per application basis. Embodiments provide a flag to determine whether to process invalid data. In certain embodiments, the flag indicates whether a conversion exception should be thrown for invalid data or whether the invalid data should be interpreted as a valid value (e.g., converted to a valid value or a NULL value). With embodiments, it is up to either a data source driver or a mid-tier level to define this flag. In certain embodiments, there is a Java® Database Connectivity (JDBC) driver, and a property is defined as a JDBC connection property to define the flag. ((Java is a registered trademark of Oracle Corporation in the United States and/or other countries.) The following are example code samples in which the connection property treatInvalidValuesAsNull is used to set the flag for different types of databases, Database1 and Database2:

jdbc:Database1://<host>[:port]/<database_name>:
treatInvalidValuesAsNull=true; (Code Sample 1: Database1 JDBC Connection URL with custom property)
jdbc:Database2://<host>[:port]/<psb_name>:
treatInvalidValuesAsNull=true; (Code Sample 2: Database2 JDBC Connection URL with custom property)

In certain embodiments, after the decision has been made as to which behavior an application will follow, the data marshaller 120, during marshalling and/or un-marshalling routines, inspects the flag and throws either an exception or returns another value (e.g., a NULL value).

In certain embodiments, a packed decimal ("PackedDecimal") conversion utility converts from binary data to a packed decimal object. The packed decimal format defines that the lowest nibble determines the sign of the value. The only valid values are 0xC for positive numbers, 0xD for negative numbers, and 0xF for unsigned numbers. Invalid packed decimal values may occur when the sign nibble does not equal 0xC, 0xD, or 0xF. There are many reasons why this may occur. For example, the data could may corrupted because a bit was changed by accident or in cases in which the memory buffer may be interpreted multiple ways (such as with a COBOL REDEFINES statement).

Figure 3:
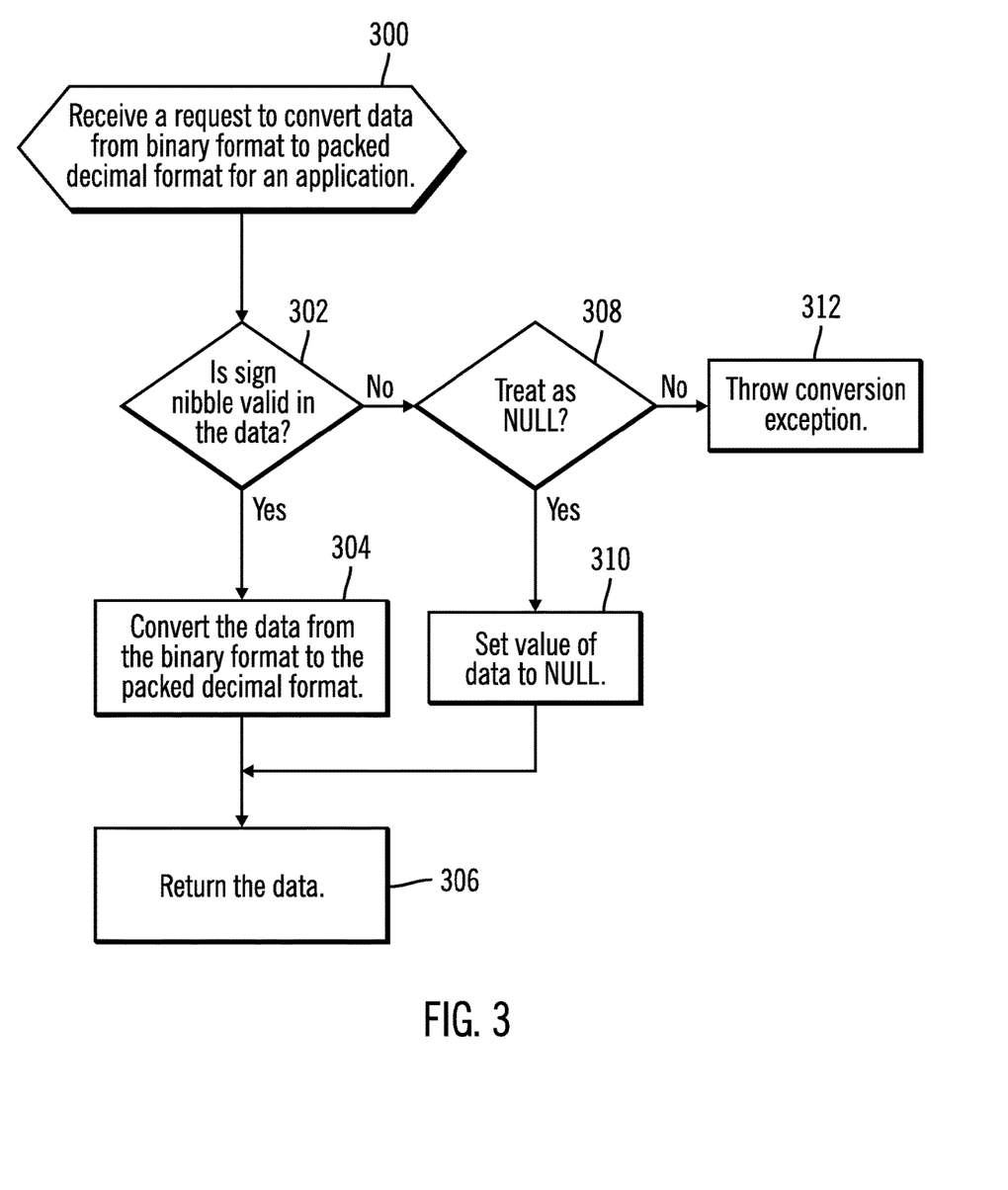
FIG. 3 illustrates, in a flow diagram, operations for determining how to process invalid data for a conversion utility in accordance with certain embodiments.

FIG. 3 illustrates, in a flow diagram, operations for determining how to process invalid data for a conversion utility in accordance with certain embodiments. Control begins at block 300 with the data marshaller 120 receiving a request to convert data from binary format to packed decimal format for an application. In block 302, the data marshaller 120 determines whether a sign nibble is valid in the data. If so, processing continues to block 304, otherwise, processing continues to block 306.

In block 304, the data marshaller 120 convert the data from the binary format to the packed decimal format. In block 306, the data marshaller 120 returns the data.

In block 308, the data marshaller 120 determines whether the data is to be treated as NULL. If so, processing continues to block 310, otherwise, processing continues to block 312. In block 310, the data marshaller 120 sets a value of the data to NULL, and processing continues from block 310 to block 306. In block 312, the data marshaller 120 throws a conversion exception. A conversion exception may be described as an error message that is returned (e.g., to a client). An exception may be described as a common term related to a programmatic error, and the conversion part refers to the type of error. In certain embodiments, LOB data may have multiple field definitions for the same data buffer, and, in some situations (e.g., where a packed decimal and a character field overlap), there may be invalid data. That is, it is possible that some character strings will equate to an invalid packed decimal value. With embodiments, one or more fields in the LOB may have invalid data, but the LOB may still be processed (e.g., with the invalid data set to valid values or to NULL values).

In certain embodiments, the behavior may also be determined at the query level as opposed to the application level. In certain embodiments, instead of providing a custom JDBC connection property to set a flag on the data source driver for an application, the behavior may be added to part of the data query language. Certain embodiments add an additional keyword to SQL to tell which of one or more columns of a table are to have invalid values be interpreted as NULL. That is, a new keyword may be added to a query to indicate that invalid data in a specified column of a table is to be treated as NULL. The following query example in Code Sample 3, shows how invalid values in the column PACKEDVALUE in a table may be set to NULL with the INVALIDASNULL keyword:

SELECT INVALIDASNULL(PACKEDVALUE) FROM TBL

That is, Code Sample 3 provides a sample SQL query with a dynamic keyword (INVALIDASNULL) for setting invalid values to NULL.

Thus, embodiments allow optional coercion of invalid datum to NULL-valued data or other formats of data in order to allow a query or similar operation to complete with approximate results, rather than failing.

Figure 4:
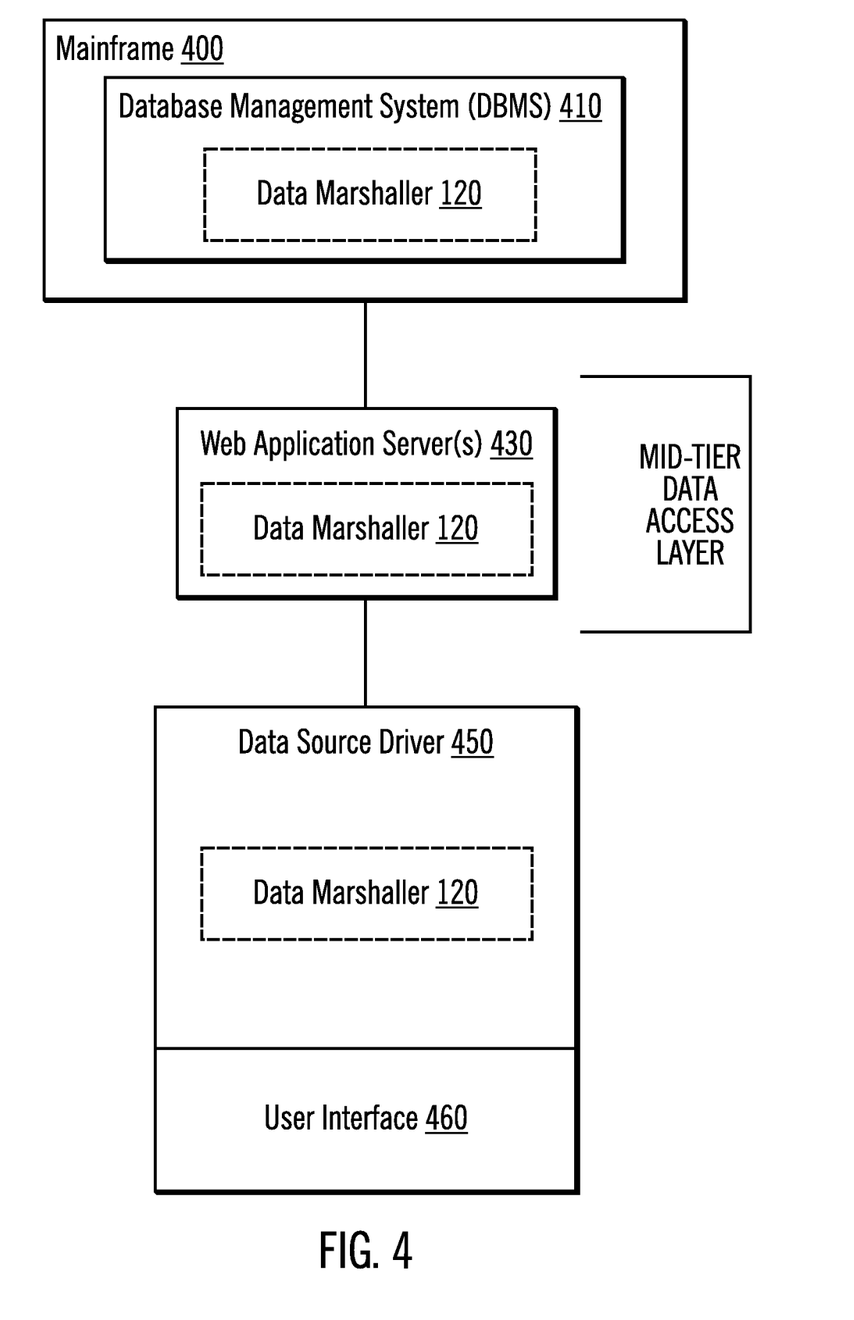
FIG. 4 illustrates a tiered architecture having multiple data access layers in accordance with certain embodiments.

FIG. 4 illustrates a tiered architecture having multiple data access layers in accordance with certain embodiments. A mainframe 400 at one tier is coupled to one or more web application servers 430 at a mid-tier data access layer. The mainframe 400 includes a Database Management System (DBMS) 410. The web application servers 430 are coupled to a data source driver 450 at another tier. The data source driver 450 is coupled to a user interface 460. The user interface 460 may be a web page accessing the data on the mainframe 400. In various embodiments, a data marshaller 120 may be part of the DBMS 410, each of the one or more web application servers 430, and/or the data source driver 450.

Embodiments provides a mechanism to interpret bad or corrupted data that may be applied to either a myriad of data source drivers for the data sources 150a . . . 150n or at a mid-tier data access layer that does data aggregation of the different data sources 150a . . . 150n.

In certain embodiments, a web application server at the mid-tier data access layer or a data source driver may detect when data is bad during the marshalling or un-marshalling of binary data to a defined data type. Instead of throwing a driver specific conversion error, the web application server may treat the value as NULL based on the flag.

Tools and applications may be built to handle NULL data types, and embodiments allow these tools and applications to continue operating as normal by replacing invalid data values with NULL values. With embodiments, if the data velocity is more important than having all the data be valid, the corrupted data may not heavily skew the results as a NULL value is typically discounted in both aggregates and analytics.

Also, with embodiments, tools do not require driver or database specific exception handling.

Moreover, with embodiments, if new data types are introduced as BLOBs, without additional type safety checks (e.g., to check that the data is valid) on the BLOB data, embodiments will convert invalid data to enable the BLOB to be processed.

Also, since, with a query, if one of the items returned in the query is corrupted, then the query as a whole will fail, embodiments provide valid data in place of invalid data to allow the query to be properly and completely executed.

With embodiments, the flag may be set per application or the query may be submitted with a special keyword (e.g., the INVALIDASNULL keyword) to enable selection of either data velocity or data accuracy.

Figure 5:
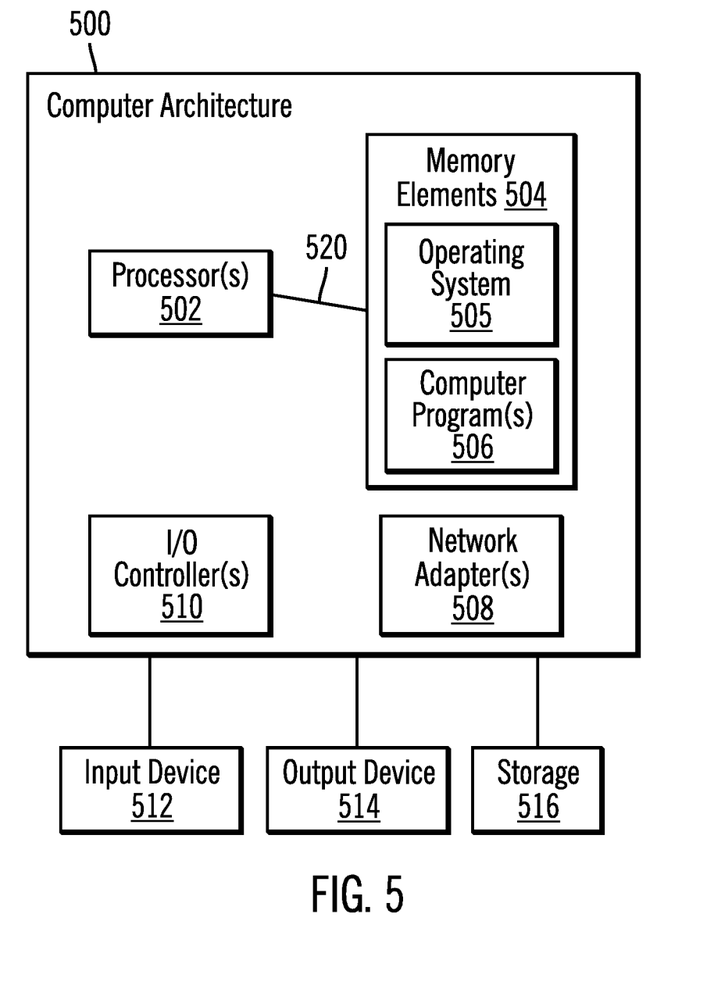
FIG. 5 illustrates, in a block diagram, a computer architecture that may be used in accordance with certain embodiments.

FIG. 5 illustrates a computer architecture 500 that may be used in accordance with certain embodiments. In certain embodiments, computing device 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks.

Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
    setting, by the at least one processor, a flag to indicate one of that invalid data is to be interpreted as valid data and that a conversion exception is to be thrown, wherein the flag is set for a query by an application;
    receiving, by the at least one processor, a request to convert data in a database from a first format to a second format for the application, wherein the data is a portion of a data set that includes other data that has been determined to be valid data;
    determining, by the at least one processor, that the data is invalid data, wherein the invalid data is corrupted data that cannot be converted to the second format and cannot be processed by the application in the first format;
    checking, by the at least one processor, the flag;
    in response to the flag indicating that the invalid data is to be interpreted as valid data,
        converting, by the at least one processor, the invalid data to a new value in the second format to form the valid data, wherein a pre-defined specification provides rules for the conversion of the invalid data to the valid data, and wherein the new value is one of a valid value and a NULL value that can be processed by the application; and
        returning, by the at least one processor, the valid data; and
    in response to the flag indicating that the conversion exception is to be thrown, issuing, by the at least one processor, an indication that the conversion exception has been thrown.

2. The computer program product of claim 1, wherein a new flag is set for the application using a connection property to set the flag on a data source driver.

3. The computer program product of claim 1, wherein the new value is a different value that allows conversion of the data from the first format to the second format.

4. The computer program product of claim 1, wherein the program code is executable by the at least one processor to perform:
    receiving the query with a new keyword added to indicate that invalid data in a column of a table is to be treated as the NULL value.

5. The computer program product of claim 1, wherein the data is Large Object (LOB) data.

6. The computer program product of claim 1, wherein the program code is executable by the at least one processor to perform:
    receiving a new request to convert data from binary format to packed decimal format.

7. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations, the operations comprising:
    setting a flag to indicate one of that invalid data is to be interpreted as valid data and that a conversion exception is to be thrown, wherein the flag is set for a query by an application;
    receiving a request to convert data in a database from a first format to a second format for the application, wherein the data is a portion of a data set that includes other data that has been determined to be valid data;
    determining that the data is invalid data, wherein the invalid data is corrupted data that cannot be converted to the second format and cannot be processed by the application in the first format;
    checking the flag;
    in response to the flag indicating that the invalid data is to be interpreted as valid data,
        converting the invalid data to a new value in the second format to form the valid data, wherein a pre-defined specification provides rules for the conversion of the invalid data to the valid data, and wherein the new value is one of a valid value and a NULL value that can be processed by the application; and
        returning the valid data; and
    in response to the flag indicating that the conversion exception is to be thrown, issuing an indication that the conversion exception has been thrown.

8. The computer system of claim 7, wherein a new flag is set for the application using a connection property to set the flag on a data source driver.

9. The computer system of claim 7, wherein the new value is a different value that allows conversion of the data from the first format to the second format.

10. The computer system of claim 7, wherein the operations further comprise:
    receiving the query with a new keyword added to indicate that invalid data in a column of a table is to be treated as the NULL value.

11. The computer system of claim 7, wherein the data is Large Object (LOB) data.

12. The computer system of claim 7, wherein the operations further comprise:
    receiving a new request to convert data from binary format to packed decimal format.

* * * * *